US011994967B2

(12) United States Patent
O'Brien

(10) Patent No.: US 11,994,967 B2
(45) Date of Patent: May 28, 2024

(54) PROTOCOL AWARE OSCILLOSCOPE FOR BUSSES WITH SIDEBAND AND CONTROL SIGNALS FOR ERROR DETECTION

(71) Applicant: Tektronix, Inc., Beaverton, OR (US)

(72) Inventor: Joshua J. O'Brien, Aloha, OR (US)

(73) Assignee: Tektronix, Inc., Beaverton, OR (US)

( * ) Notice: Subject to any disclaimer, the term of this patent is extended or adjusted under 35 U.S.C. 154(b) by 301 days.

(21) Appl. No.: 17/094,677

(22) Filed: Nov. 10, 2020

(65) Prior Publication Data

US 2021/0149781 A1     May 20, 2021

Related U.S. Application Data

(60) Provisional application No. 62/936,354, filed on Nov. 15, 2019.

(51) Int. Cl.
*G06F 11/26*     (2006.01)
*G06F 11/22*     (2006.01)
(Continued)

(52) U.S. Cl.
CPC ............ *G06F 11/26* (2013.01); *G06F 11/221* (2013.01); *G06F 13/20* (2013.01); *H04L 1/0013* (2013.01);
(Continued)

(58) Field of Classification Search
CPC ........ G06F 11/26; G06F 11/221; G06F 13/20; H04L 1/0013; H04L 1/0015; H04L 1/203;
(Continued)

(56) References Cited

U.S. PATENT DOCUMENTS 7,272,528 B2 * 9/2007 Holaday ............ G01R 31/3177
324/555
7,480,839 B2 * 1/2009 Smith ................ G01R 13/0254
714/744

(Continued)

FOREIGN PATENT DOCUMENTS

WO     2003058946     7/2003

*Primary Examiner* — Albert Decady
*Assistant Examiner* — Osman M Alshack
(74) *Attorney, Agent, or Firm* — Miller Nash LLP; Andrew J. Harrington

(57) ABSTRACT

A test and measurement device includes an input port for receiving a bus conducting data from a device under test, and processing element coupled to the input port. The processing element is configured to execute instructions that cause the processing element to determine a data sequence from a signal of the bus received on a main channel of the device, and use information from at least one other signal of the bus on an auxiliary channel of the device based upon a protocol associated with the bus to adjust parameters for performing error detection on the data sequence. A method of performing error detection in a test instrument includes receiving, at an input port of the test instrument, a bus conducting a data sequence from a device under test, determining the data sequence from a signal of the bus received on a main channel of the test instrument, and using information from at least one other signal of the bus received on an auxiliary channel of the test instrument to perform error detection on the data sequence.

18 Claims, 4 Drawing Sheets

(51) Int. Cl.
  *G06F 13/20* (2006.01)
  *H04L 1/00* (2006.01)
  *H04L 1/20* (2006.01)
  *H04L 7/00* (2006.01)

(52) U.S. Cl.
  CPC ............ *H04L 1/0015* (2013.01); *H04L 1/203* (2013.01); *H04L 7/0016* (2013.01); *H04L 2001/0094* (2013.01)

(58) Field of Classification Search
  CPC ........... H04L 7/0016; H04L 2001/0094; H04L 1/0002; H04L 1/242; H04L 12/40; Y02D 10/00; G01R 13/02; G01R 13/0209
  USPC ............................................ 714/43, 738, 742
  See application file for complete search history.

(56) References Cited

U.S. PATENT DOCUMENTS

| | | | |
|---|---|---|---|
| 7,671,856 B2* | 3/2010 | Varaprasad | H04N 17/00 345/10 |
| 7,801,206 B2* | 9/2010 | Calvin | H04L 1/243 714/724 |
| 2008/0228426 A1* | 9/2008 | Calvin | G01R 31/31709 702/124 |
| 2010/0228508 A1* | 9/2010 | Smith | G01R 13/0254 702/68 |
| 2011/0041047 A1* | 2/2011 | Tran | H04L 1/242 714/819 |
| 2011/0154171 A1* | 6/2011 | Tran | G01R 31/31716 714/E11.024 |
| 2011/0242333 A1* | 10/2011 | Zhu | H04N 17/00 348/194 |
| 2012/0001657 A1* | 1/2012 | Sullivan | G01R 13/0254 327/90 |
| 2013/0231883 A1* | 9/2013 | Smith | G01R 31/50 702/68 |
| 2014/0059384 A1* | 2/2014 | Tran | G01R 31/3171 714/E11.178 |
| 2015/0121149 A1* | 4/2015 | Cooke | H04L 1/0041 714/43 |
| 2015/0293170 A1* | 10/2015 | Knierim | G01R 31/28 702/124 |
| 2018/0276164 A1* | 9/2018 | Das Sharma | G06F 13/4265 |

* cited by examiner

PROTOCOL AWARE OSCILLOSCOPE FOR BUSSES WITH SIDEBAND AND CONTROL SIGNALS FOR ERROR DETECTION

RELATED APPLICATIONS

This disclosure claims benefit of U.S. Provisional Patent Application No. 62/936,354, titled "PROTOCOL ANALYSIS FOR A BUS HAVING SIDEBAND AND CONTROL SIGNALS NECESSARY FOR ERROR DETECTION," filed Nov. 15, 2019, which is incorporated herein in its entirety.

TECHNICAL FIELD

This disclosure relates to test and measurement instruments with error detection, and more particularly to test and measurement instruments employing sideband signals for error detection.

BACKGROUND

Some test and measurement devices, such as oscilloscopes, include error detectors that can look at a signal, such as a signal conforming to a particular protocol in a device under test (DUT), on a single channel input and lock to a pattern. The oscilloscope or other device can examine the data for errors. This approach works for protocols that have a continuous pattern on a single channel with no dependence on other signals. However, some protocols have sideband signals that affect how to track the pattern.

In addition, many of these approaches use a clock extracted from the data, and do not allow for measuring Bit Error Ratio (BER) during specific events on devices under test like the occurrence of cross-talk or large power draws.

Embodiments of the disclosed apparatus and methods address shortcomings in the prior art.

DETAILED DESCRIPTION

The embodiments here enable using sideband signals that affect how the pattern needs to be tracked, including gating measurements, altering the bit rate, changing the pattern, or adjusting the timing. The embodiments also allow the use of a discrete clock or strobe, rather than a clock that is extracted from the data. The embodiments also allow for measuring the bit error rate (BER) during specific events on the device under test (DUT) like cross-talk or larger power draws.

Figure 1:
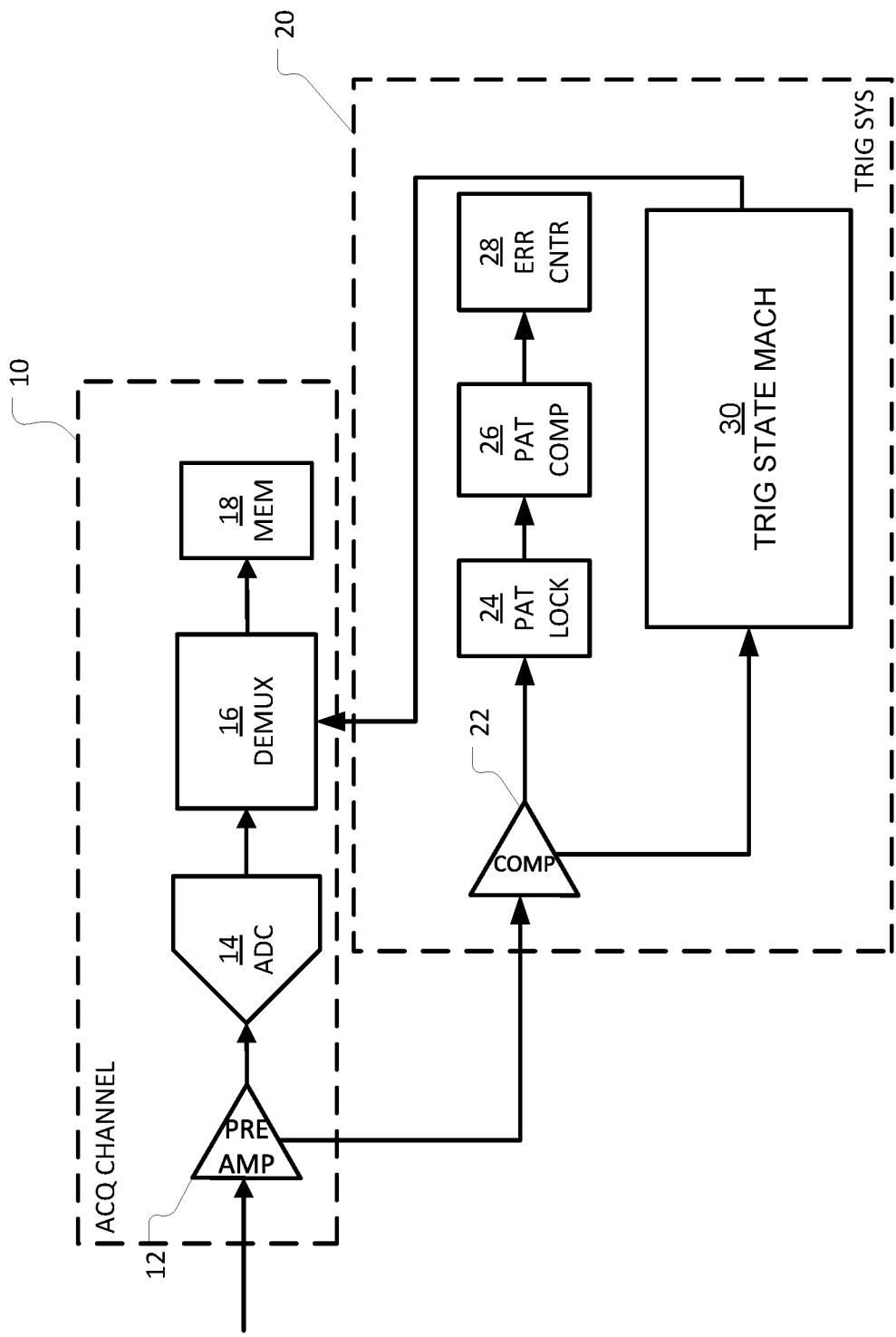
FIG. 1 shows an example of a conventional analog trigger system with error detection.

FIG. 1 shows an oscilloscope architecture with an analog trigger system having an error detector. The discussion here will focus on oscilloscopes as an example, but one should note that the implementations used here could apply to any test and measurement device that receives a data pattern through a channel.

Generally, error detection occurs by the device receiving a single channel input and locking onto a pattern. The user can then examine the pattern for errors. FIG. 1 shows an acquisition channel 10 that acquires an input analog data signal. The signal may undergo signal conditioning, including amplification provided by preamplifier 12. The acquisition channel then converts the analog signals to digital using analog-to-digital converter (ADC) 14. The signal is then demultiplexed by demultiplexer 16 and then may be stored in the acquisition memory 18.

The trigger system 20 also receives the input analog data signal, or as shown in FIG. 1 the input analog data signal after signal conditioning, via a second analog signal path. A trigger comparator 22 or comparators receives the input signal. The trigger comparator 22 may comprise multiple comparators to handle multi-level logic. The trigger comparators may also receive other input signals such as one or more external "trigger in" signals. The trigger comparator 22 typically detects different trigger conditions and sends that as an input to the trigger state machine 30. The trigger state machine 30 generates an output signal that associates a portion of the input signal with the triggering event. The demultiplexer 16 receives the output signal. Examples of these triggering events include edge, pulse width, runt, glitch, timeout, etc.

The signal from the trigger comparator 22 to the pattern lock logic block 24 is the start of the error detector. This block may align the pattern being matched to the incoming data at a known bit rate and pattern. The pattern lock logic block 24 may also have learning capabilities to learn short patterns and lock to them. The pattern compare block 26 compares the matched pattern and the acquired pattern once the lock is achieved, and the error counter 28 counts the errors.

Figure 2:
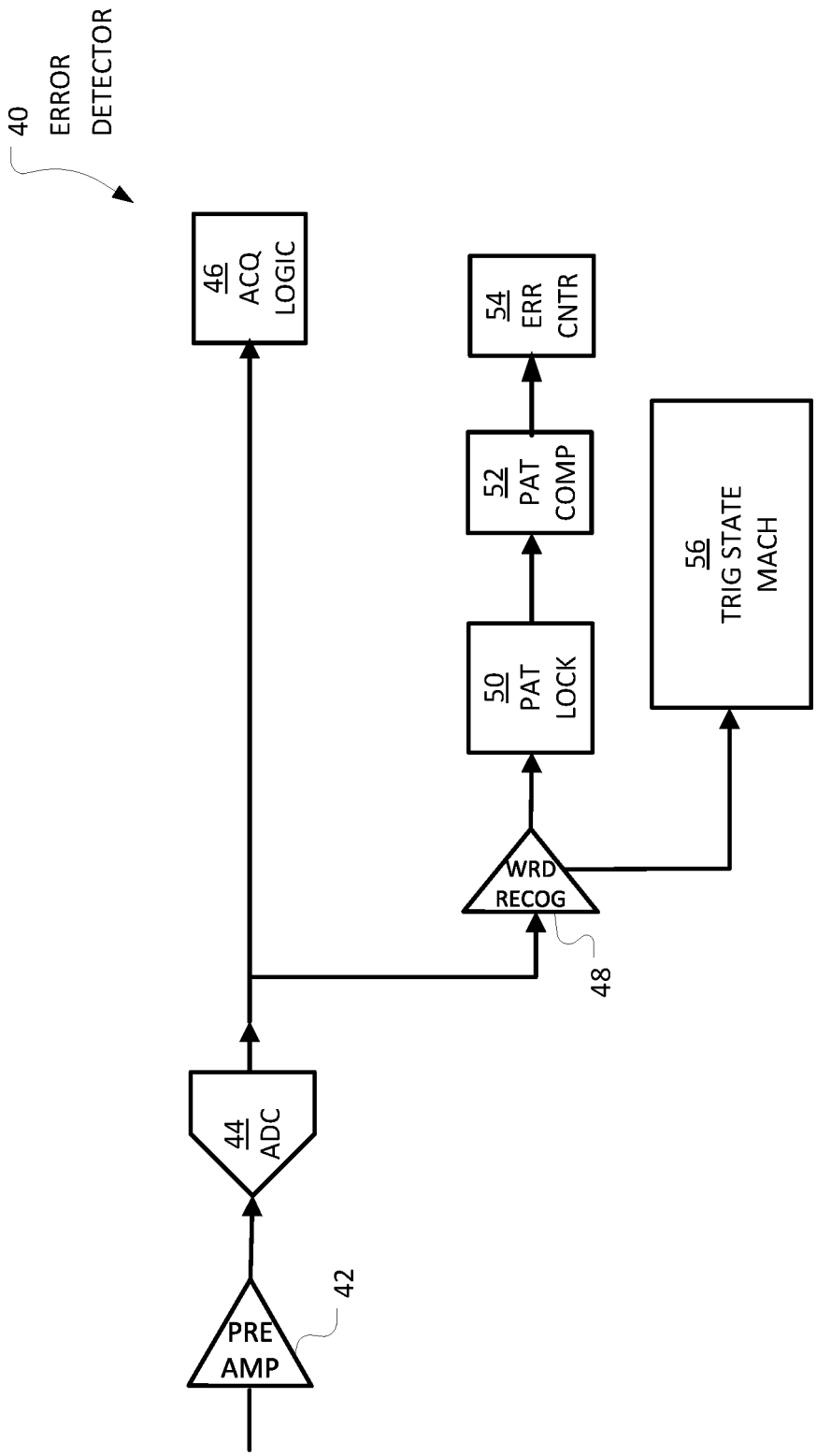
FIG. 2 shows an example of a conventional digital trigger system with error detection.

FIG. 2 shows another example of an error detector 40 implemented in a device having a digital trigger system. In this example, the device's acquisition channel again receives the analog input signal from the DUT through the preamp 42, but the digital input to the trigger system comes from the output of the ADC 44, which may also connect to the acquisition logic 46, which will also contain the acquisition memory. Since this example device has a digital trigger system, word recognizers such as word recognizer 48 replace the comparators 22 used in the analog trigger system example shown in FIG. 1. The word recognizers compare word patterns between a received word and a reference word, detect levels and edges of digitized signals, or patterns of digital channel inputs. Word recognizers are configurable to output events on any of these. The trigger state machine 56 uses the results from the word recognizers, as does the pattern lock block 50, pattern compare block 52, and error counter block 54. Both of the systems of FIGS. 1 and 2 require patterns with constant sequence and rate to achieve pattern lock.

Figure 3:
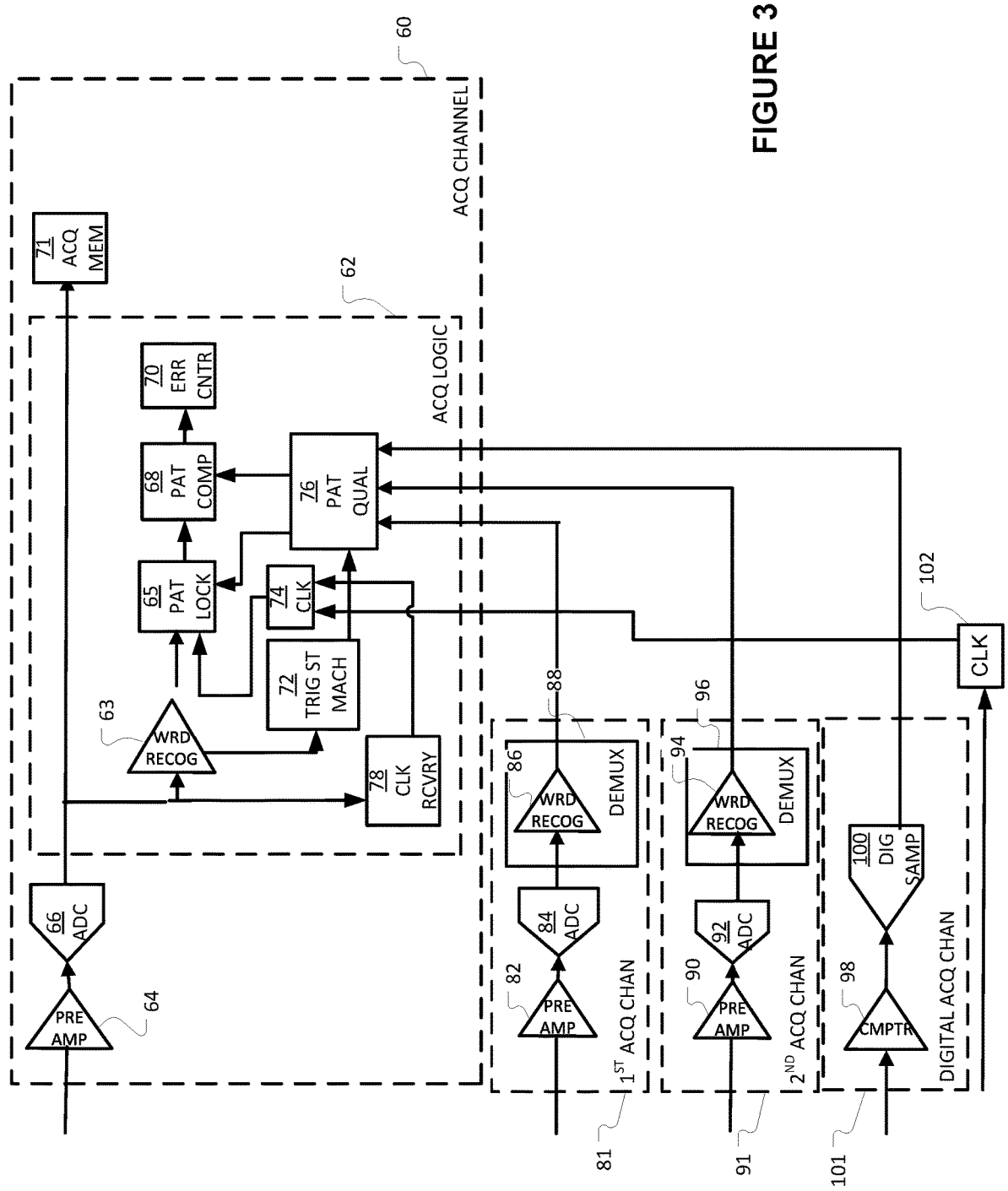
FIG. 3 shows an embodiment of a digital trigger system with error detection.

In contrast, the embodiment of FIG. 3 uses inputs from other channels on the bus received, sometimes called sideband channels, to qualify the sequence or to control what sequence or bit rate is used for matching. As will be discussed with regards to some specific scenarios below, the information on the sideband channels can qualify the sequence. For example, the information may control what sequence or bit rate is used for matching during comparisons to detect errors. The information ensures that the sequence being matched to the expected pattern has the correct timing and bit rate, which can increase the accuracy of the error detection.

The main channel of the instrument connected to the bus, the acquisition channel 60, has the preamplifier 64 and any other conditioning circuitry, and the ADC 66. The output of the ADC undergoes demultiplexing through the logic 62 to the acquisition memory 71. The trigger state machine 72 and the error detector uses the output of the word recognizer 63. As in the example of FIG. 2, the error detector comprises the pattern lock block 65, the pattern compare block 68, and the error counter block 70.

The embodiment of FIG. 3 has a pattern qualification logic block 76 that uses information from at least one other sideband signal received on one or more channels other than the main channel, referred to here as auxiliary channels or inputs. In one embodiment, a first auxiliary input 81 also has a preamp 82, an ADC 84, and a demultiplexer 88 that has a word recognizer 86. A second auxiliary input 91 also has a preamp 90, an ADC 92, and a demultiplexer 96 with a word recognizer 94. The pattern qualification logic 76 uses the auxiliary inputs 81, 91.

Some embodiments may be implemented in a mixed signal oscilloscope (MSO). A mixed signal oscilloscope is a type of a digital storage oscilloscope that displays and compares both analog and digital signals. In these embodiments, the MSO may also have a digital acquisition channel or input 101 such as that shown by comparator 98 and digital sampler 100 in FIG. 3.

One should note that the discussion here may refer to the logic 62 as a processing element. The individual components may be various logical elements such as comparators, word recognizers, the pattern qualification logic 76, etc. One or more of these individual components may be encompassed into a field programmable gate array (FPGA), an application specification integrated circuit (ASIC), etc.

In the embodiment of FIG. 3, a clock recovery block 78 recovers a clock signal from the signal output of the ADC 66. A multiplexer 74 uses the recovered clock and/or an external clock 102, if one is provided. If the system uses an external clock 102, it may come in on a sideband signal through another channel of the bus, or it may be provided as an external clock source. As discussed above, the bus has sideband signals on channels other than the main channel 60.

The pattern qualification logic 76 receives one or more of the outputs of the auxiliary inputs 81 and 91, and the digital acquisition input 101, if present. The pattern qualification logic 76 sends signals to the error counter 70 and the pattern lock block 65.

Figure 4:
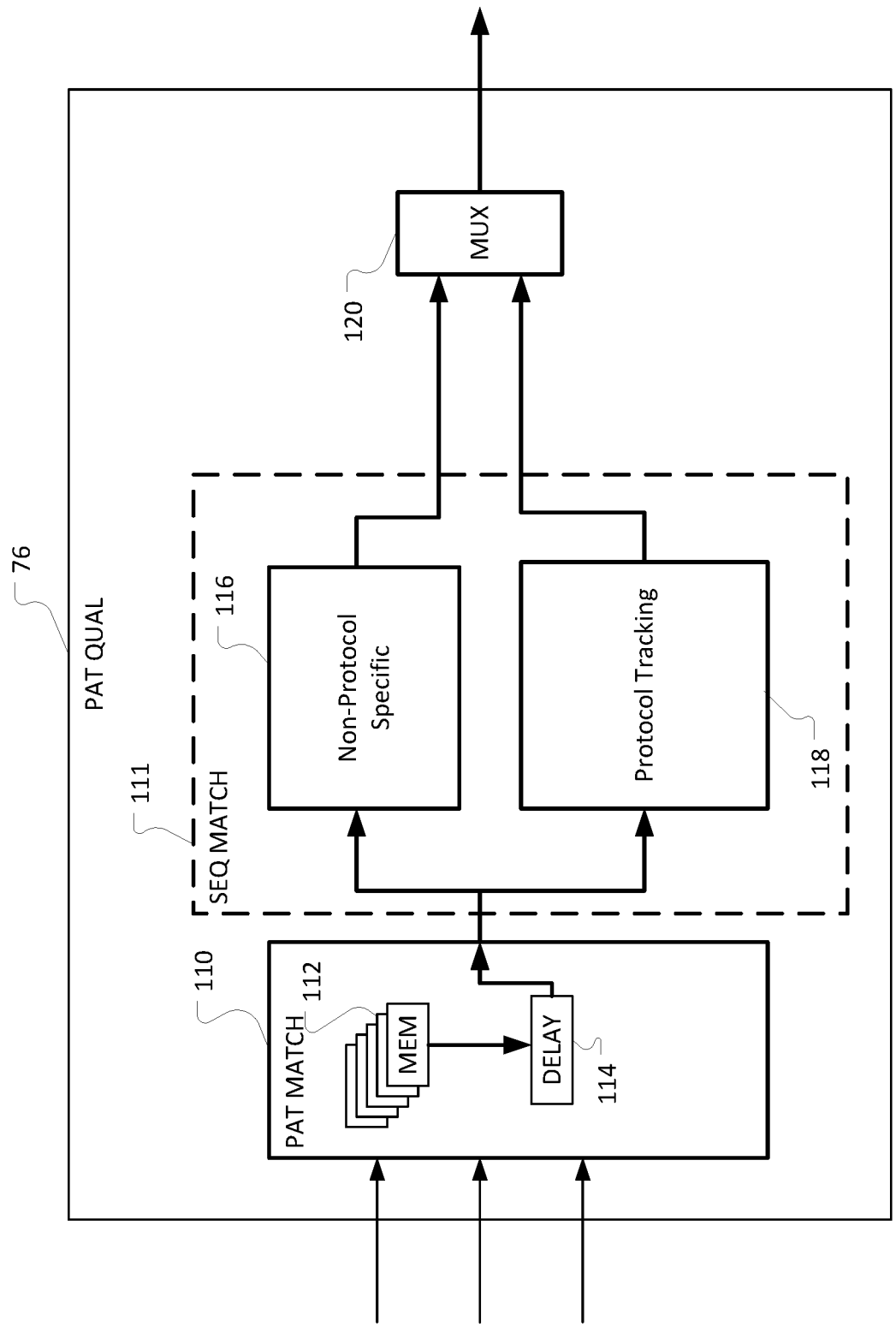
FIG. 4 shows an embodiment of a pattern qualification logic block.

FIG. 4 shows an example embodiment of the pattern qualification logic 76. The embodiment shown in FIG. 4 is just one example of pattern qualification logic 76. As understood by one of ordinary skill in the art, there are multiple ways in which to implement pattern matching logic that can operate simultaneously, or in a sequence, in the pattern qualification logic 76.

The inputs from the main acquisition channel and the auxiliary channel(s) are used to put a captured sequence into a pattern matching circuit 110 in parallel or in series. The pattern matching circuit 110 may have several banks of memories 112, which may contain look up tables, and a timing delay element 114. The timing delay may allow the coordination of the timing of the input sequence to the matching of the pattern, and the timing delay 114 may comprise multiple timing delays and stages of logic circuitry. The output of the pattern matching circuit 110 may be input to a sequence matching circuit 111. The sequence matching circuit 111 may be user-selectable between a non-protocol specific circuit 116 and a protocol tracking circuit 118. The inputs signals may be mapped to a sequence in one of the matching circuits 116 and 118. If the user has identified a bus having a particular protocol and that protocol uses sideband signals, the pattern match circuit will send the output signal to the Protocol Tracking sequence matching circuit 118. If the user has not identified a particular protocol, the system will use the Non-Protocol Specific sequence matching circuit 116. The process may still refer to a protocol, where the protocol here is a non-specific protocol. The circuits 116 and 118 may also include a memory and a delay. The results of either circuit is selected by the MUX 120 and output to the acquisition logic and memory to allow determination of the BER.

The simplest instantiation of the pattern qualification logic circuit is a single signal qualifier. An example of this would be measuring the BER during a power supply event. An auxiliary channel is assigned as the qualifier and the pattern qualification logic is configured to reject any errors counted while the level of the power supply doesn't meet the criteria. This enables BER testing during power optimization.

Another level of complexity would be to allow for a known delay between the auxiliary signal and the signal being measured. Logic that allows for a delay of the qualification accounts for probing and DUT skew differences.

The embodiment of logic shown in FIG. 4 allows for combining multiple auxiliary signals into patterns with different skews. This logic also allows the qualification to be based on a complex sequence of patterns on these auxiliary signals. This logic may be used to decode complex command busses, such as those used in Double Data Rate (DDR) memory devices like DDR Gen 5 Synchronous Dynamic Random-Access Memory (SDRAM). For example, this logic may be used to qualify and isolate only DDR read data. This logic can also be used on other command busses or packetized sideband busses.

In an exemplary embodiment, the bus protocol may be High-Definition Multimedia Interface (HDMI). HDMI has a side, or auxiliary, channel called the Data Display Channel (DDC). The DDC is based on the Inter-Integrated Circuit ($I^2C$) bus, and is physically bundled in an HDMI cable with the main HDMI high-speed differential signals. Serial packets on the DDC bus determine at what bit rate the HDMI is running. The error detector of FIG. 3 can monitor the DDC channel and wait to receive the command that the main channel, high speed serial bus is running at the desired data rate. The error detector then would run at this data rate until a user stops it or a command to change to a new data rate is received. The stop or change command would stop the BER results from failing when the error detector loses lock due to the bit range change. For HDMI, the use lies in the ability to change the data rate by detecting internal errors. Otherwise, the user would not have a way to determine the number of errors because the system just shifts to a lower speed and this makes it difficult to debug.

The sideband communication for some busses are complex enough to require specialized logic. This specialized protocol logic could be implemented as many different protocol tracking blocks in an ASIC or FPGA. Or these blocks could be implemented as a FPGA block that is reprogrammed to the current standard that is needed. One simple example of a unique sideband is the Peripheral Component Interconnect (PCI) Express (PCIe) 100 MHz clock burst used to change transmitter equalizer settings in compliance. Tracking these bursts of clock is unique to PCIe compliance. It is required to track BER separately for each transmitter equalization setting.

One should note that this merely constitutes an example of an implementation of the embodiments and is not intended to limit the scope of the claims, and no such limitation should be implied.

Examples of the disclosure may operate on a particularly created hardware, on firmware, digital signal processors, or on a specially programmed general purpose computer including a processor operating according to programmed instructions. The terms "controller" or "processor" as used herein are intended to include microprocessors, microcomputers, ASICs, and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Electrically Erasable Programmable Read-Only Memory (EEPROM), Random Access Memory (RAM), etc. As will be appreciated by one of skill in the art, the functionality of the program modules may be combined or distributed as desired in various examples. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Aspects of the present disclosure operate with various modifications and in alternative forms. Specific aspects have been shown by way of example in the drawings and are described in detail herein below. However, it should be noted that the examples disclosed herein are presented for the purposes of clarity of discussion and are not intended to limit the scope of the general concepts disclosed to the specific examples described herein unless expressly limited. As such, the present disclosure is intended to cover all modifications, equivalents, and alternatives of the described aspects in light of the attached drawings and claims.

References in the specification to embodiment, aspect, example, etc., indicate that the described item may include a particular feature, structure, or characteristic. However, every disclosed aspect may or may not necessarily include that particular feature, structure, or characteristic. Moreover, such phrases are not necessarily referring to the same aspect unless specifically noted. Further, when a particular feature, structure, or characteristic is described in connection with a particular aspect, such feature, structure, or characteristic can be employed in connection with another disclosed aspect whether or not such feature is explicitly described in conjunction with such other disclosed aspect.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include Random Access Memory (RAM), Read Only Memory (ROM), Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

EXAMPLES

Illustrative examples of the disclosed technologies are provided below. An embodiment of the technologies may include one or more, and any combination of, the examples described below.

Example 1 is test and measurement device, comprising: an input port for receiving a bus conducting data from a device under test; and a processing element coupled to the input port and configured to execute instructions that cause the processing element to: determine a data sequence from a signal of the bus received on a main channel of the device; and use information from at least one other signal of the bus received on an auxiliary channel of the device based upon a protocol associated with the bus to adjust parameters for performing error detection on the data sequence.

Example 2 is the device of Example 1, wherein the processing element comprises a pattern lock circuit, a pattern comparator, and an error counter.

Example 3 is the device of Example 2, wherein the processing element further comprises a clock recovery circuit.

Example 4 is any of the Examples 1 through 3, wherein the processing element comprises a trigger state machine and pattern qualification logic.

Example 5 is the device of Example 4, wherein the pattern qualification logic includes a pattern matching circuit and a sequence matching circuit.

Example 6 is the device of Example 5, wherein the pattern matching circuit comprises at least one look up table and a delay element.

Example 7 is the device of Example 6, wherein the sequence matching circuit comprises a non-protocol specific sequence matching circuit and a protocol tracking sequence matching circuit.

Example 8 is the device of any of Examples 1-7, wherein the auxiliary channel has a preamplifier, an analog-to-digital converter, and a word recognizer.

Example 9 is the device of any of Examples 1-8, wherein the auxiliary channel has a comparator and a digital sampler.

Example 10 is the device of any of Examples 1-9, wherein adjusting parameters includes at least one of a gating of a measurement, adjusting a bit rate, altering a pattern, and adjusting timing.

Example 11 is the device of any of Examples 1-12, wherein the processing element comprises one of either a field-programmable gate array (FPGA) or an application-specific integrated circuit (ASIC).

Example 12 is the device of any of Examples 1-12, wherein the processing element is reprogrammable to different bus protocols.

Example 13 is the device of any of Examples 1-12, further comprising a user interface, wherein the processing element is further configured to execute instructions that cause the processing element to perform error detection on the data sequence when the protocol associated with the bus is identified by a user through the user interface.

Example 14 is the device of Examples 13, wherein the processing element is further configured to execute instructions that cause the processing element to perform error detection on the data sequence when the protocol associated with the bus is not identified by a user through the user interface.

Example 15 is a method of performing error detection in a test instrument, comprising: receiving, at an input port of the test instrument, a bus conducting a data sequence from a device under test; determining the data sequence from a signal of the bus on a main channel of the test instrument; and using information from at least one other signal of the bus on an auxiliary channel of the device to perform error detection on the data sequence.

Example 16 is the method of Example 15, wherein using the information from the at least one other signal includes at least one of determining a bit rate, gating measurements, altering a pattern, and adjusting timing on the main channel.

Example 17 is the method of either of Examples 15 and 16, wherein using the information from the at least one other signal comprises using the signal in a pattern qualification circuit within the main channel of the device.

Example 18 is the method of any of Examples 15-17, wherein using information from the at least one other signal comprises using a state signal from a trigger state machine by a pattern qualification circuit within a processing element.

Example 19 is the method of any of Examples 17, further comprising generating at least one output signal from the pattern qualification circuit.

Example 20 is the method of Example 19, wherein the at least one output signal comprises at least one of an output to a pattern lock block and an output to an error counter.

Although specific embodiments have been illustrated and described for purposes of illustration, it will be understood that various modifications may be made without departing from the spirit and scope of the disclosure. Accordingly, the invention should not be limited except as by the appended claims.

The invention claimed is:
1. A test and measurement device, comprising:
   an input port for receiving a bus conducting data from a device under test; and
   a processing element coupled to the input port and configured to execute instructions that cause the processing element to:
   determine a data sequence from a signal from the bus received on a main channel of the device; and
   use information from at least one sideband signal from the bus received on an auxiliary channel of the device, the information on the auxiliary channel is based upon a protocol associated with the bus, to adjust parameters for performing error detection on the data sequence in the main channel when the protocol associated with the bus is identified by one of a user through a user interface, or not identified by a user through the user interface.

2. The device as claimed in claim 1, wherein the processing element comprises a pattern lock circuit, a pattern comparator, and an error counter.

3. The device as claimed in claim 2, wherein the processing element further comprises a clock recovery circuit.

4. The device as claimed in claim 1, wherein the processing element comprises a trigger state machine and pattern qualification logic.

5. The device as claimed in claim 4, wherein the pattern qualification logic includes a pattern matching circuit and a sequence matching circuit.

6. The device as claimed in claim 5, wherein the pattern matching circuit comprises at least one look up table and a delay element.

7. The device as claimed in claim 5, wherein the sequence matching circuit comprises a non-protocol specific sequence matching circuit and a protocol tracking sequence matching circuit.

8. The device as claimed in claim 1, wherein the auxiliary channel has a preamplifier, an analog-to-digital converter, and a word recognizer.

9. The device as claimed in claim 1, wherein the auxiliary channel has a comparator and a digital sampler.

10. The device as claimed in claim 1, wherein adjusting parameters includes at least one of gating a measurement, adjusting a bit rate, altering a pattern, and adjusting timing.

11. The device as claimed in claim 1, wherein the processing element comprises one of either a field-programmable gate array (FPGA) or an application-specific integrated circuit (ASIC).

12. The device as claimed in claim 1, wherein the processing element is reprogrammable to different bus protocols.

13. A method of performing error detection in a test instrument, comprising:
   receiving, at an input port of the test instrument, a bus conducting a data sequence from a device under test;
   determining the data sequence from a signal from the bus received on a main channel of the test instrument; and
   using information from at least one sideband signal from the bus received on an auxiliary channel of the test instrument to perform error detection on the data sequence in the main channel when the protocol associated with the bus is identified by one of a user through a user interface, or not identified by a user through the user interface.

14. The method as claimed in claim 13, wherein using information from the at least one sideband signal includes at least one of determining a bit rate, gating measurements, altering a pattern, and adjusting timing on the main channel.

15. The method as claimed in claim 13, wherein using information from the at least one sideband signal comprises using the signal in a pattern qualification circuit within the main channel of the device.

16. The method as claimed in claim 13, wherein using information from the at least one sideband signal comprises using a state signal from a trigger state machine by a pattern qualification circuit within a processing element.

17. The method as claimed in claim 16, further comprising generating at least one output signal from the pattern qualification circuit.

18. The method as claimed in claim 17, wherein the at least one output signal comprises at least one of an output to a pattern lock block and an output to an error counter.

* * * * *